United States Patent
Yan et al.

(10) Patent No.: US 9,891,472 B2
(45) Date of Patent: Feb. 13, 2018

(54) ELECTROPHORETIC LIGHT GUIDE PLATE, BACKLIGHT UNIT, DISPLAY DEVICE AND DISPLAY CONTROL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Long Yan, Beijing (CN); Lin Lin, Beijing (CN); Jun Zhang, Beijing (CN); Zhengyuan Zhang, Beijing (CN); Zhiyu Qian, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 33 days.

(21) Appl. No.: 14/908,422

(22) PCT Filed: Sep. 9, 2015

(86) PCT No.: PCT/CN2015/089262
§ 371 (c)(1),
(2) Date: Jan. 28, 2016

(87) PCT Pub. No.: WO2016/150110
PCT Pub. Date: Sep. 29, 2016

(65) Prior Publication Data
US 2017/0045796 A1   Feb. 16, 2017

(30) Foreign Application Priority Data
Mar. 26, 2015 (CN) .......................... 2015 1 0137686

(51) Int. Cl.
*G09G 3/34* (2006.01)
*G02F 1/167* (2006.01)
(Continued)

(52) U.S. Cl.
CPC ....... *G02F 1/133615* (2013.01); *G02B 6/005* (2013.01); *G02F 1/167* (2013.01);
(Continued)

(58) Field of Classification Search
CPC ......... G02F 2001/133601; G02F 1/167; G02F 1/133606; G02F 1/133615; G02F 2201/44;
(Continued)

(56) References Cited

U.S. PATENT DOCUMENTS 6,215,920 B1 * 4/2001 Whitehead ............. G02B 26/02
    349/63
6,618,104 B1 * 9/2003 Date ....................... G02B 6/005
    349/201
(Continued)

FOREIGN PATENT DOCUMENTS

CN    2586182 Y    11/2003
CN    1508597 A     6/2004
(Continued)

OTHER PUBLICATIONS

First Office Action for Chinese Application No. 201510137686.3, dated Apr. 1, 2017, 7 Pages.
(Continued)

*Primary Examiner* — Darlene M Ritchie
(74) *Attorney, Agent, or Firm* — Brooks Kushman P.C.

(57) ABSTRACT

The disclosure provides a light guide plate, a backlight unit, a display device and a display control system. The light guide plate has a first operation state and a second operation state. In the first operation state, an upper surface of the light
(Continued)

guide plate is a surface where light comes out, and in the second operation state, the upper surface of the light guide plate includes a light exiting region and a non-light exiting region. In the technical solution of the present disclosure, when the display device performs a regional displaying, the light guide plate operates in the second operation state, here the upper surface of the light guide plate includes the light exiting region and the non-light exiting region; light emitted by a light source finally comes out from the light exiting region of the light guide plate after reflections inside the light guide plate.

13 Claims, 2 Drawing Sheets

(51) Int. Cl.
  *G02F 1/1335* (2006.01)
  *F21V 8/00* (2006.01)
(52) U.S. Cl.
  CPC . *G09G 3/342* (2013.01); *G02F 2001/133601* (2013.01); *G02F 2201/44* (2013.01); *G09G 3/3406* (2013.01)
(58) Field of Classification Search
  CPC ........ G02B 6/005; G02B 6/68; G02B 6/0033; G02B 6/0063; G02B 6/00; G02B 6/0011; G02B 6/0025; G02B 6/0031; G02B 6/0055; G02B 6/0046; G02B 6/0048; G02B 6/0076; G02B 6/008; G02B 6/0068; G02B 6/0075; G02B 6/0078; G09G 2330/021; G09G 2330/022; G09G 2330/023; G09G 3/3406; G09G 3/3413; G09G 3/342; G09G 3/3426; G09G 3/3433
  USPC .................................................. 362/97.2, 561
  See application file for complete search history.

(56) References Cited

U.S. PATENT DOCUMENTS

| | | | |
|---|---|---|---|
| 2002/0033909 A1* | 3/2002 | Hiyama | G02B 6/0033 349/65 |
| 2005/0104615 A1 | 5/2005 | Kim | |
| 2005/0275933 A1 | 12/2005 | Johnson et al. | |
| 2006/0056791 A1* | 3/2006 | Tzschoppe | H04N 13/0454 385/146 |
| 2006/0061705 A1 | 3/2006 | Onishi | |
| 2006/0104084 A1* | 5/2006 | Amemiya | G02B 5/003 362/561 |
| 2006/0139289 A1* | 6/2006 | Yoshida | G09G 3/342 345/98 |
| 2010/0060600 A1 | 3/2010 | Wang et al. | |
| 2010/0194785 A1 | 8/2010 | Huitema et al. | |
| 2010/0265566 A1* | 10/2010 | Han | G02F 1/133615 359/296 |
| 2010/0302805 A1 | 12/2010 | Jeong et al. | |
| 2012/0092395 A1* | 4/2012 | Seetzen | G02F 1/133615 345/690 |
| 2012/0262505 A1 | 10/2012 | Muto et al. | |
| 2012/0293717 A1* | 11/2012 | Takata | G02F 1/133615 348/725 |
| 2014/0016301 A1* | 1/2014 | Brown Elliott | G02F 1/133603 362/97.1 |
| 2014/0293188 A1* | 10/2014 | Chen | G09G 3/3426 349/65 |
| 2015/0002563 A1* | 1/2015 | Chen | G09G 3/36 345/697 |
| 2015/0049465 A1* | 2/2015 | Park | G02F 1/133606 362/97.1 |
| 2015/0285987 A1 | 10/2015 | Yang et al. | |
| 2016/0161802 A1* | 6/2016 | Kwon et al. | G02F 1/133621 362/97.3 |
| 2016/0275882 A1* | 9/2016 | Duan | G09G 3/3406 |
| 2017/0045796 A1 | 2/2017 | Yan et al. | |

FOREIGN PATENT DOCUMENTS

| | | |
|---|---|---|
| CN | 1616977 A | 5/2005 |
| CN | 1668972 A | 9/2005 |
| CN | 1752820 A | 3/2006 |
| CN | 101290440 A | 10/2008 |
| CN | 101290441 A | 10/2008 |
| CN | 101290442 A | 10/2008 |
| CN | 101452673 A | 6/2009 |
| CN | 101666931 A | 3/2010 |
| CN | 102473380 A | 5/2012 |
| CN | 102654594 A | 9/2012 |
| CN | 102737588 A | 10/2012 |
| CN | 101290441 B | 12/2012 |
| CN | 103533617 A | 1/2014 |
| CN | 103912827 A | 7/2014 |
| CN | 104696887 A | 6/2015 |
| WO | 2008048100 A1 | 4/2008 |

OTHER PUBLICATIONS

International Search Report and Written Opinion for Application No. PCT/CN2015/089262, dated Dec. 28, 2015, 12 Pages.

Second Office Action for Chinese Application No. 201510137686.3, dated Aug. 21, 2017, 7 Pages.

* cited by examiner

ELECTROPHORETIC LIGHT GUIDE PLATE, BACKLIGHT UNIT, DISPLAY DEVICE AND DISPLAY CONTROL

CROSS-REFERENCE TO RELATED APPLICATION

The present application is the U.S. national phase of PCT Application No. PCT/CN2015/089262 filed on Sep. 9, 2015, which claims priority of Chinese Patent Application No. 201510137686.3 filed on Mar. 26, 2015, the disclosure of which is incorporated in its entirety by reference herein.

TECHNICAL FIELD

The present disclosure relates to the field of display technology, in particular, to a light guide plate, a backlight unit, a display device and a display control system.

BACKGROUND

Among panel display devices, the Thin Film Transistor Liquid Crystal Display (TFT-LCD) has advantages such as small size, low power consumption, relative cheap cost and free of radiation, and accordingly holds a dominant position in the current panel display market.

At present, regional displaying function can be implemented in the TFT-LCD. Taking a cellular phone as an example, when a protective casing for the cellular phone is closed, some general information such as time information, weather information or incoming call information can be displayed on a region of the screen of the cellular phone where corresponds to a window of the protective casing, while other regions of the screen of the cellular phone are in black. In this way, the user can perform some basic operations without opening the protective casing, for example, may answer an incoming call or check the time information, weather information, messages, etc.

The conventional technology has the following disadvantage. The whole screen of the TFT-LCD operates in a full power consumption state during the regional displaying, which results in high power consumption of the display device.

SUMMARY

The present disclosure intends to provide a light guide plate, a backlight unit, a display device and a display control system, to decrease power consumption of a display device during a regional displaying.

A light guide plate is provided according to one embodiment of the present disclosure. The light guide plate has a first operation state and a second operation state. In the first operation state, an upper surface of the light guide plate is a surface where light comes out, and in the second operation state, the upper surface of the light guide plate includes a light exiting region and a non-light exiting region.

In the technical solution of the embodiment of the present disclosure, when the display device performs the regional displaying, the light guide plate operates in the second state. Here the upper surface of the light guide plate includes the light exiting region and the non-light exiting region; the light emitted by a light source finally comes out from the light exiting region of the light guide plate after reflections inside the light guide plate. Compared with conventional technologies, the utilization ratio of light is relative high when the display device performs the regional displaying; therefore, under the premise of satisfying requirements for displaying, power consumption of the light source can be decreased, i.e., power consumption of the display device during the regional displaying is decreased.

Optionally, a first electrophoresis film is arranged at a sectional interface of the light guide plate between the light exiting region and the non-light exiting region. The first electrophoresis film, under the control of a first voltage, is transmittable by light, and the light guide plate operates in the first operation state. The first electrophoresis film, under the control of a second voltage, reflects the light, and the light guide plate operates in the second operation state.

In the technical solution, when the display device performs the regional displaying, the first electrophoresis film can reflect the light. Light emitted by the light source into the light guide plate can come out from the light exiting region of the light guide plate after various reflections, while no light may come out from the non-light exiting region of the light guide plate. The utilization ratio of light is relatively high when the display device performs the regional displaying; therefore, under the premise of satisfying requirements for displaying, power consumption of the light source can be decreased, i.e., power consumption of the display device during the regional displaying is decreased.

Optionally, the first electrophoresis film is perpendicular to the upper surface, and the light exiting region and the non-light exiting region locates at two sides of the first electrophoresis film.

Optionally, a second electrophoresis film is arranged in the non-light exiting region of the light guide plate. The second electrophoresis film, under the control of a third voltage, is transmittable by light and the light guide plate operates in the first operation state. The second electrophoresis film, under the control of a fourth voltage, reflects the light and the light guide plate operates in the second operation state.

In the technical solution, when the display device performs the regional displaying, a lower surface of the second electrophoresis film can reflect the light. Light emitted by the light source into the light guide plate may come out from the light exiting region of the light guide plate after various reflections, while no light may come out from the non-light exiting region of the light guide plate. The utilization ratio of light is relatively high when the display device performs the regional displaying; therefore, under the premise of satisfying requirements for displaying, power consumption of the light source can be decreased, i.e., power consumption of the display device during the regional displaying is decreased.

Optionally, the second electrophoresis film is laid on the upper surface in the non-light exiting region.

Optionally, a light transmittable film is arranged in the light exiting region of the light guide plate; and the light transmittable film and the second electrophoresis film are adjacent and located in a same layer.

Optionally, the light guide plate includes a wedge-shaped light guide plate or a flat light guide plate.

Based on the same inventive concept, a backlight unit is further provided according to one embodiment of the present disclosure. The backlight unit includes the light guide plate as described in any of the previous technical solutions, and a light source arranged at a side of the light guide plate where light enters. A display device including such backlight unit has a relative low power consumption during a regional displaying.

Optionally, there are at least two light sources, and one of the light sources corresponding to the non-light exiting region of the light guide plate is turned on when the light guide plate operates in the first operation state and is turned off when the light guide plate operates in the second operation state. With such technical solution, the power consumption of the backlight unit when the display device performs the regional displaying can be further deceased, thereby decreasing the power consumption of the display device.

Based on the same inventive concept, a display device is further provided according to one embodiment of the present disclosure. The display device includes the backlight unit as described in any of the previous technical solutions. The display device has a relative low power consumption during a regional displaying.

Optionally, the liquid crystal panel includes at least two gate line driving units; one of the gate line driving units corresponding to the non-light exiting region of the light guide plate outputs a signal to a corresponding gate line when the light guide plate operates in the first operation state and stops outputting the signal to the corresponding gate line when the light guide plate operates in the second operation state; and/or the liquid crystal panel further includes at least two data line driving units; one of the data line driving units corresponding to the non-light exiting region of the light guide plate outputs a signal to a corresponding data line when the light guide plate operates in the first operation state and stops outputting the signal to the corresponding data line when the light guide plate operates in the second operation state. With such technical solution, the logic power consumption of the liquid crystal panel can be decreased, thereby further decreasing the power consumption of the display device during a regional displaying.

Based on the same inventive concept, a display control system is further provided according to one embodiment of the present disclosure. The display control system includes a liquid crystal panel, the backlight unit according to foregoing embodiments, and a control unit in signal communication with both the liquid crystal panel and the backlight unit The control unit is used to, on reception of a regional displaying instruction, control the light guide plate of the backlight unit to operate in the second operation state.

In addition, a backlight unit is further provided according to one embodiment of the present disclosure, including:

a light guide plate provided with a electrophoresis film; and a light source arranged at a side of the light guide plate;

where the light guide plate includes an operating surface, the operating surface is divided into a first region and a second region by the electrophoresis film, and the first region is a light exiting surface;

where the electrophoresis film, under the control of a first voltage, is transmittable by light and allows light emitted by the light source to come out from the second region by passing through the electrophoresis film, and the second region functions as a light exiting surface; and where the electrophoresis film, under the control of a second voltage, reflects the light, and allows no light emitted by the light source to pass through the electrophoresis film to come out from the second region, and the second region functions as a non-light exiting surface.

Optionally, the electrophoresis film is perpendicular to the operating surface, the first region and the second region locate at two sides of the electrophoresis film, and the light source locates at a lateral side of the light guide plate.

Optionally, the electrophoresis film is laid in the second region. The light source locates at a lateral side of the light guide plate, or the light source locates at a side of the light guide plate, the side being opposite to the operating surface.

DETAILED DESCRIPTION OF THE EMBODIMENTS

A light guide plate, a backlight unit, a display device and a display control system are provided according to embodiments of the present disclosure, to lower power consumption of a display device during regional displaying. To further clarify objectives, technical solutions and advantages of the present disclosure, the disclosure is further detailed hereinafter with embodiments.

A light guide plate provided according to one embodiment of the present disclosure has a first operation state and a second operation state. In the first operation state, an upper surface of the light guide plate is a surface where light comes out. In the second operation state, the upper surface of the light guide plate includes a light exiting region and a non-light exiting region.

When a display device performs a regional displaying, the light guide plate operates in the second operation state, in this case, the upper surface of the light guide plate includes the light exiting region and the non-light exiting region; light emitted from a light source to the light guide plate is reflected inside the light guide plate and finally comes out from the light exiting region of the light guide plate. Compared with the conventional technology, utilization ratio of light is enhanced during the regional displaying of the display device; hence, under a premise of satisfying displaying requirements, power consumption of the light source can be lowered, that is, power consumption of the display device during the regional displaying is lowered.

In respective embodiments of the present disclosure, the light guide plate can be embodied as a wedge-shaped light guide plate or a flat light guide plate. The wedge-shaped light guide plate is preferred, since the wedge-shaped light guide plate can optimize the optical design, enhance the utilization ratio of light and improve brightness and uniformity of the backlight unit.

Figure 1:
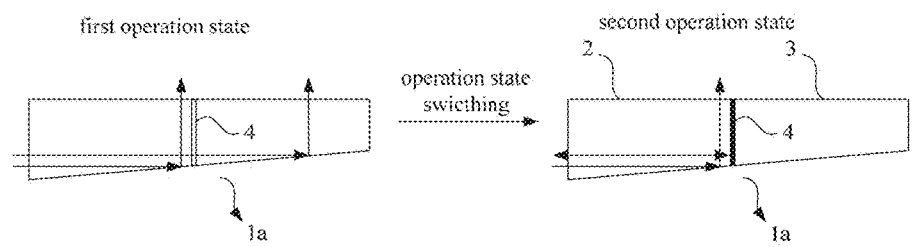
FIG. 1 is a schematic diagram showing a light guiding principle of a light guide plate according to one embodiment of the present disclosure.

As shown in FIG. 1, according to one embodiment of the present disclosure, a first electrophoresis film 4 is arranged at a sectional interface of a light guide plate 1*a* between a light exiting region 2 (also called as a first region) and a non-light exiting region 3 (also called as a second region). The first electrophoresis film 4, under the control of a first voltage, is transmittable by light, such that the light guide plate 1*a* operates in the first operation state. The first electrophoresis film 4, under the control of a second voltage, reflects the light, such that the light guide plate 1*a* operates in the second operation state.

Electrophoresis means the movement of a charged particle towards an electrode of opposite charge to the charged particle under an electric field. When the first voltage is applied to the first electrophoresis film 4, the first electrophoresis film 4 is transmittable by the light; in this case, the light guide plate 1*a* operates in the first operation state, the upper surface of the light guide plate 1*a*, i.e., an operating surface, is a surface where the light comes out, which is similar to a common light guide plate. When the second voltage is applied to the first electrophoresis film 4, the first electrophoresis film 4 reflects the light and the light cannot pass through the first electrophoresis film 4; hence, a part (the non-light exiting region 3) of the upper surface of the light guide plate 1*a* cannot be transmitted by the light and a corresponding image region of a backlight unit is dim. The liquid crystal panel itself does not emit light. The regional displaying of the display device can be achieved by a regional lighting of the backlight unit.

In the conventional technology, the entire region of the backlight unit is lighted when the display device performs the regional displaying, and the power consumption is relative high. However, in the embodiment shown in FIG.1 of the present disclosure, when the display device performs the regional displaying, the first electrophoresis film 4 can reflect the light, the light emitted from the light source to the light guide plate 1*a* may come out from the light exiting region 2 of the light guide plate 1*a* after various reflections between the first electrophoresis film 4 and a reflector (not shown in the figure); while no light may come out from the non-light exiting region 3 of the light guide plate 1*a*. The utilization ratio of light is relatively high when the display device performs the regional displaying; therefore, under the premise of satisfying requirements for displaying, power consumption of the light source can be decreased, i.e., power consumption of the display device during the regional displaying is decreased.

Figure 2:
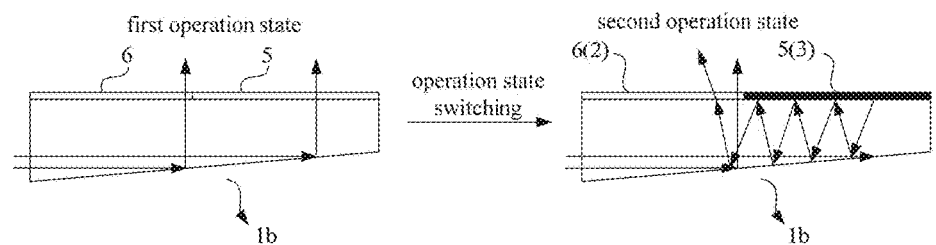
FIG. 2 is a schematic diagram showing a light guiding principle of a light guide plate according to another embodiment of the present disclosure.

As shown in FIG. 2, according to another embodiment of the present disclosure, a second electrophoresis film 5 is arranged in a non-light exiting region 3 of a light guide plate 1*b*. The second electrophoresis film 5, under the control of a third voltage, is transmittable by light, such that the light guide plate 1*b* operates in a first operation state. The second electrophoresis film 5, under the control of a fourth voltage, reflects the light, such that the light guide plate 1*b* operates in a second operation state.

Similar to the principle of the embodiment shown in FIG. 1, when the third voltage is applied to the second electrophoresis film 5, the first electrophoresis film 5 is transmittable by the light; in this case, the light guide plate 1*b* operates in the first operation state, an upper surface of the light guide plate 1*b* is a surface where the light comes out, which is similar o a common light guide plate. When the fourth voltage is applied to the second electrophoresis film 5, the second electrophoresis film 5 reflects the light and the light cannot pass through the second electrophoresis film 5; hence, a part (the non-light exiting region 3) of the upper surface of the light guide plate 1*b* cannot be transmitted by the light and a corresponding image region of a backlight unit is dim. The liquid crystal panel itself does not emit light. The regional displaying of the display device can be achieved by a regional lighting of the backlight unit.

In the technical solution, when the display device performs a regional displaying, a lower surface of the second electrophoresis film 5 can reflect the light. The light emitted by a light source into the light guide plate 1*b* may come out from a light exiting region 2 of the light guide plate 1*b* after various reflections between the second electrophoresis film 5 and a reflector (not shown in the figure); while no light may come out from the non-light exiting region 3 of the light guide plate 1*b*. The utilization ratio of light is relatively high when the display device performs the regional displaying; therefore, under the premise of satisfying requirements for displaying, power consumption of the light source can be decreased, i.e., power consumption of the display device during the regional displaying is decreased.

As shown in FIG. 2, a light transmittable film 6 is further arranged in the light exiting region 2 of the light guide plate 1*b*. The light transmittable film 6 has a same thickness as the second electrophoresis film 5. The light transmittable film 6 and the second electrophoresis film 5 may be coated on or adhered to an upper surface of the body of the light guide plate, while specific process for forming those films are not limited herein. It should be noted that, the light transmittable film 6, the second electrophoresis film 5 and the body of the light guide plate may be independent components and may be assembled inside a backlight unit. In addition, the light transmittable film may be an electrophoresis film under the control of the third voltage.

Figure 3:
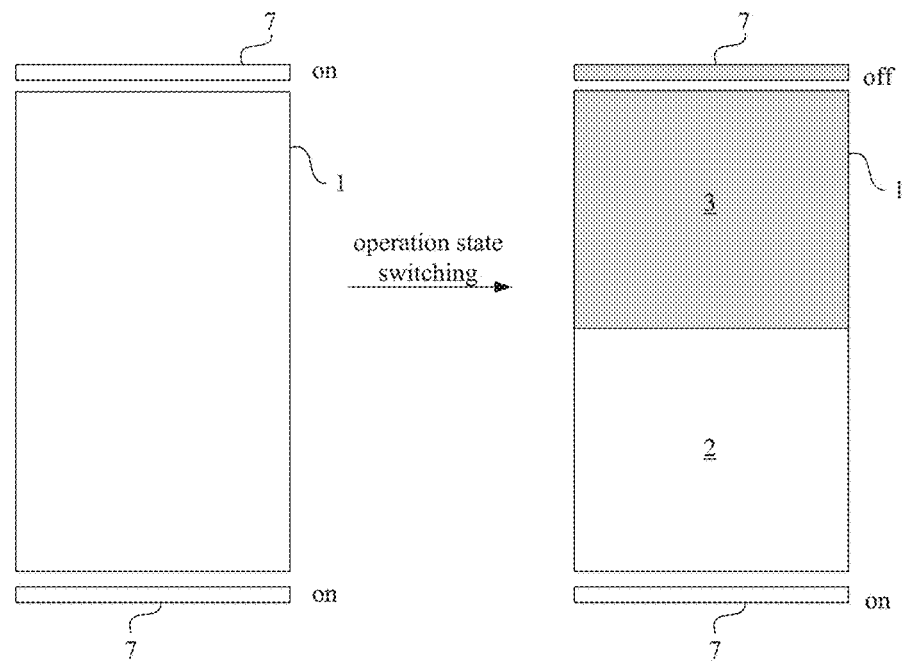
FIG. 3 is a schematic diagram showing operation state switching of a backlight unit according to one embodiment of the present disclosure.

Based on the same inventive concept, a backlight unit is further provided according to one embodiment of the present disclosure. As shown in FIG. 3, the backlight unit includes a light guide plate 1 according to any of the foregoing embodiments and a light source 7 located at a side of the light guide plate where light enters. In view of the above descriptions, a display device including such backlight unit has a relative low power consumption during a regional displaying.

The type of the light source 7 is not limited herein. For example, the light source 7 may be a light-emitting diode (LED) or may be a cold cathode fluorescent lamp (CCFL) or the like. A specific position for arranging the light source 7 is not limited herein and may be designed in consideration of the specific structure of the light guide plate 1. For the light guide plate 1*a* as shown in FIG. 1, the light source may be arranged at a lateral side of the light guide plate and the light enters the light guide plate through the lateral side of the light guide plate. For the light guide plate 1*b* as shown in FIG. 2, the light source may be arranged at a lateral side of the light guide plate and the light enters the light guide plate through the lateral side of the light guide plate; alternatively, the light source may be arranged below the light guide plate and the light enters the light guide plate through the bottom of the light guide plate.

As shown in FIG. 3, there are at least two light sources 7. One light source 7 corresponding to a non-light exiting region 3 of the light guide plate 1 may be turned on when the light guide plate 1 operates in the first operation state and turned off when the light guide plate 1 operates in the second operation state. With this technical solution, the power consumption of the backlight unit when the display device performs the regional displaying can be further decreased, thereby decreasing the power consumption of the display device.

Based on the same inventive concept, a display device is further provided according to one embodiment of the present disclosure, including backlight unit according to any of the foregoing embodiments. In view of the above descriptions, the display device has a relative low power consumption when performing a regional displaying. The display device is not limited to specific types herein. The display device includes but is not limited to a cellular phone, a tablet computer, a liquid crystal display television, a liquid crystal display, an electronic book and so on.

Figure 4:
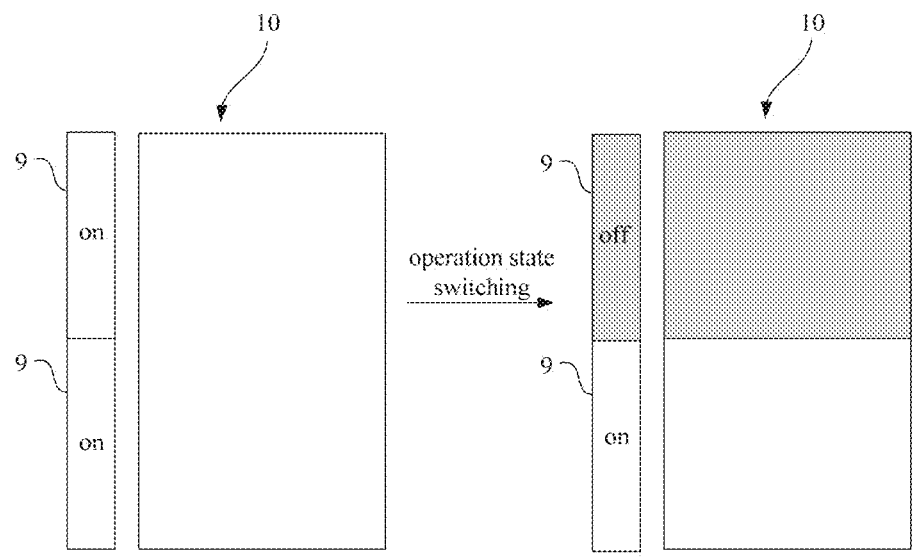
FIG. 4 is a schematic diagram showing operation state switching of a liquid crystal panel according to one embodiment of the present disclosure.

As shown in FIG. 4, optionally, a liquid crystal panel 10 includes at least two gate line driving units 9. One gate line driving unit corresponding to a non-light exiting region of the light guide plate may output a signal to a corresponding gate line when the light guide plate operates in the first operation state and may stop outputting the signal to the corresponding gate line when the light guide plate operates in the second operation state. In addition, the liquid crystal panel may include at least two data line driving units. One data line driving unit corresponding to the non-light exiting region of the light guide plate may output a signal to a corresponding data line when the light guide plate operates in the first operation state and may stop outputting the signal to the corresponding data line when the light guide plate operates in the second operation state. With this embodiment, the logic power consumption of the liquid crystal panel can be decreased, thereby further decreasing the power consumption of the display device during a regional displaying.

Figure 5:
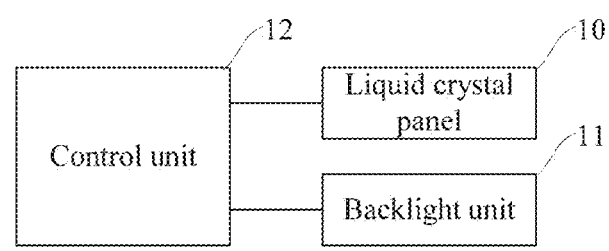
FIG. 5 is a schematic structural diagram of a display control system according to one embodiment of the present disclosure.

Based on the same inventive concept, a display control system is further provided according to one embodiment of the present disclosure. As shown in FIG. 5, the display control system includes a liquid crystal panel 10, a backlight unit 11 according to a previous embodiment, and a control unit 12 in signal communication with both the liquid crystal panel 10 and the backlight unit 11. The control unit 12 is used to, on reception of a regional displaying instruction, control a light guide plate of the backlight unit 11 to operate in a second operation state. Furthermore, the control unit 12 may, on reception of a regional displaying instruction, control a light source corresponding to the non-light exiting region of the light guide plate to be turned off and control a gate line driving unit corresponding to the non-light exiting region of the light guide plate to stop outputting a signal to a corresponding gate line. With such display control system, the power consumption of the display device during the regional displaying can be significantly decreased.

Obviously, the ordinary skilled in the art can make various modifications and changes to the present disclosure without departing from the principle and scope of the present disclosure. The present disclosure intends to include all these modifications and changes if they fall within the scope of the claims of the present disclosure or equivalent technologies.

What is claimed is:

1. A light guide plate having a first operation state and a second operation state; wherein in the first operation state, light comes out from a surface of the light guide plate; in the second operation state, the surface of the light guide plate comprises a light exiting region and a non-light exiting region;
    wherein a first electrophoresis film is arranged at a sectional interface of the light guide plate between the light exiting region and the non-light exiting region and is perpendicular to the surface of the light guide plate, and the light exiting region and the non-light exiting region are located respectively at two sides of the first electrophoresis film; wherein the first electrophoresis film, under the control of a first voltage, is transmittable by light and the light guide plate operates in the first operation state; and wherein the first electrophoresis film, under the control of a second voltage, reflects the light and the light guide plate operates in the second operation state.

2. The light guide plate according to claim 1, comprising a wedge-shaped light guide plate or a flat light guide plate.

3. The light guide plate according to claim 1, wherein the surface is an upper surface or a lower surface.

4. The light guide plate according to claim 1, wherein a second electrophoresis film is arranged in the non-light exiting region of the light guide plate; the second electrophoresis film, under the control of a third voltage, is transmittable by light and the light guide plate operates in the first operation state; and the second electrophoresis film, under the control of a fourth voltage, reflects the light and the light guide plate operates in the second operation state.

5. The light guide plate according to claim 4, wherein the second electrophoresis film is laid on the surface in the non-light exiting region.

6. The light guide plate according to claim 5, wherein a light transmittable film is arranged in the light exiting region of the light guide plate; and the light transmittable film and the second electrophoresis film are adjacent and located in a same layer.

7. A backlight unit, comprising a light guide plate and a light source located at a side of the light guide plate where light enters;
    wherein the light guide plate has a first operation state and a second operation state; wherein in the first operation state, light comes out from a surface of the light guide plate; in the second operation state, the surface of the light guide plate comprises a light exiting region and a non-light exiting region;
    wherein a first electrophoresis film is arranged at a sectional interface of the light guide plate between the light exiting region and the non-light exiting region and is perpendicular to the surface of the light guide plate, and the light exiting region and the non-light exiting region are located respectively at two sides of the first electrophoresis film; wherein the first electrophoresis film, under the control of a first voltage, is transmittable by light and the light guide plate operates in the first operation state; and wherein the first electrophoresis film, under the control of a second voltage, reflects the light and the light guide plate operates in the second operation state.

8. The backlight unit according to claim 7, wherein there are at least two light sources, and one of the light sources corresponding to the non-light exiting region of the light guide plate is turned on when the light guide plate operates in the first operation state and is turned off when the light guide plate operates in the second operation state.

9. A display device, comprising a liquid crystal panel and a backlight unit;
    wherein the backlight unit comprises a light guide plate and a light source located at a side of the light guide plate where light enters;
    wherein the light guide plate has a first operation state and a second operation state; wherein in the first operation state, light comes out from a surface of the light guide plate; in the second operation state, the surface of the light guide plate comprises a light exiting region and a non-light exiting region;
    wherein a first electrophoresis film is arranged at a sectional interface of the light guide plate between the light exiting region and the non-light exiting region and is perpendicular to the surface of the light guide plate, and the light exiting region and the non-light exiting region are located respectively at two sides of the first electrophoresis film; wherein the first electrophoresis film, under the control of a first voltage, is transmittable by light and the light guide plate operates in the first operation state; and wherein the first electrophoresis film, under the control of a second voltage, reflects the light and the light guide plate operates in the second operation state.

10. The display device according to claim 9, wherein the liquid crystal panel comprises at least two gate line driving units; one of the gate line driving units corresponding to the non-light exiting region of the light guide plate outputs a signal to a corresponding gate line when the light guide plate operates in the first operation state and stops outputting the signal to the corresponding gate line when the light guide plate operates in the second operation state; and/or the liquid crystal panel comprises at least two data line driving units; one of the data line driving units corresponding to the non-light exiting region of the light guide plate outputs a signal to a corresponding data line when the light guide plate operates in the first operation state and stops outputting the signal to the corresponding data line when the light guide plate operates in the second operation state.

11. A display control system, comprising a liquid crystal panel, a backlight unit, and a control unit in signal communication with both the liquid crystal panel and the backlight unit;
    wherein the backlight unit comprises a light guide plate and a light source located at a side of the light guide plate where light enters; wherein the light guide plate has a first operation state and a second operation state; wherein in the first operation state, light comes out from a surface of the light guide plate; in the second operation state, the surface of the light guide plate comprises a light exiting region and a non-light exiting region;
    wherein a first electrophoresis film is arranged at a sectional interface of the light guide plate between the light exiting region and the non-light exiting region and is perpendicular to the surface of the light guide plate, and the light exiting region and the non-light exiting region are located respectively at two sides of the first electrophoresis film; wherein the first electrophoresis film, under the control of a first voltage, is transmittable by light and the light guide plate operates in the first operation state; and wherein the first electrophoresis film, under the control of a second voltage, reflects the light and the light guide plate operates in the second operation state;
    wherein the control unit is configured to, on reception of a regional displaying instruction, control the light guide plate of the backlight unit to operate in the second operation state.

12. A backlight unit, comprising:
    a light guide plate provided with an electrophoresis film; and
    a light source arranged at a side of the light guide plate;
    wherein the light guide plate comprises an operating surface, the operating surface is divided into a first region and a second region by the electrophoresis film, and the first region is a light exiting surface;
    wherein the electrophoresis film, under the control of a first voltage, allows light emitted by the light source to come out from the second region by passing through the electrophoresis film, and the second region functions as a light exiting surface;
    wherein the electrophoresis film, under the control of a second voltage, allows no light emitted by the light source to pass through the electrophoresis film to come out from the second region, and the second region functions as a non-light exiting surface; and
    wherein the electrophoresis film is arranged at a sectional interface of the light guide plate between the light exiting region and the non-light exiting region and is perpendicular to the operating surface, and the light exiting region and the non-light exiting region are located respectively at two sides of the first electrophoresis film, and the light source locates at a lateral side of the light guide plate.

13. The backlight unit according to claim 12, wherein the electrophoresis film is laid in the second region; wherein the light source locates at a lateral side of the light guide plate, or the light source locates at a side of the light guide plate, the side being opposite to the operating surface.

* * * * *